(12) United States Patent
MacNeil et al.

(10) Patent No.: US 11,327,685 B1
(45) Date of Patent: May 10, 2022

(54) APPARATUS, SYSTEM, AND METHOD FOR LOCKLESS RESOURCE VERSIONING IN SINGLE WRITER MULTIPLE READER TECHNOLOGIES

(71) Applicant: Juniper Networks, Inc., Sunnyvale, CA (US)

(72) Inventors: Erin C. MacNeil, Sunnyvale, CA (US); Amit Kumar Rao, Sunnyvale, CA (US); Finlay Michael Graham Pelley, Sunnyvale, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 82 days.

(21) Appl. No.: 16/907,544

(22) Filed: Jun. 22, 2020

(51) Int. Cl.
  *G06F 3/06* (2006.01)
(52) U.S. Cl.
  CPC .......... *G06F 3/0659* (2013.01); *G06F 3/0604* (2013.01); *G06F 3/0673* (2013.01)
(58) Field of Classification Search
  None
  See application file for complete search history.

(56) References Cited

U.S. PATENT DOCUMENTS

| | | | | |
|---|---|---|---|---|
| 7,827,559 | B1* | 11/2010 | Rhee ...................... | G06F 9/526 718/104 |
| 9,128,749 | B1* | 9/2015 | Wang ...................... | G06F 9/546 |
| 10,474,664 | B2* | 11/2019 | Bhargava ............ | G06F 16/2343 |
| 2001/0014905 | A1* | 8/2001 | Onodera ................... | G06F 9/52 718/102 |
| 2012/0030681 | A1* | 2/2012 | Krauss ................... | G06F 9/455 718/102 |
| 2017/0220474 | A1* | 8/2017 | Dice ................... | G06F 16/1774 |

* cited by examiner

*Primary Examiner* — Elias Mamo
(74) *Attorney, Agent, or Firm* — FisherBroyles, LLP (57) ABSTRACT

A disclosed method may include (1) publishing, by a writer, a first context that represents a lockless data structure at a first moment in time for access by a set of readers, (2) upon the publication of the first context, directing at least one of the readers to access an object stored in shared memory via the first context, (3) publishing, by the writer, a second context that represents the lockless data structure at a second moment in time for access by the set of readers, and (4) upon the publication of the second context, directing the at least one of the readers to access an additional object stored in the shared memory via the second context. Various other apparatuses, systems, and methods are also disclosed.

20 Claims, 6 Drawing Sheets

APPARATUS, SYSTEM, AND METHOD FOR LOCKLESS RESOURCE VERSIONING IN SINGLE WRITER MULTIPLE READER TECHNOLOGIES

BACKGROUND

Single writer multiple reader technologies are often implemented to facilitate parallel access to dynamic data within a computing device and/or system. Unfortunately, in conventional single writer multiple reader technologies, certain problems that impair performance may arise. For example, a conventional single writer multiple reader technology may involve implementing a locking mechanism that enables the multiple readers and the single writer to lock objects stored in shared memory. In this example, a locked object in shared memory may be unreadable and/or over-writable for all processes that did not initiate the lock themselves. When the object is no longer needed, the last reader to access the object may release it for reclamation. Such a locking mechanism may be inefficient as ideally all the readers should be able to access any object in shared memory simultaneously. Moreover, the procedure for locking and/or unlocking those objects may take time and/or consume processing power, thereby potentially impairing performance.

As an additional example, a conventional single writer multiple reader technology may involve implementing a read counting mechanism that tracks the number of readers currently accessing the objects stored in shared memory. In this example, the readers may increment the read count of an object stored in shared memory upon accessing that object, and the readers may decrement the read count of an object stored in shared memory once they no longer need that object. When the read count of an object reaches zero, the object may be released for reclamation. The procedure for incrementing and/or decrementing the read count of those objects may take time and/or consume processing power or memory, thereby potentially impairing performance.

The instant disclosure, therefore, identifies and addresses a need for additional and improved apparatuses, systems, and methods for lockless resource versioning in single writer multiple reader technologies.

SUMMARY

As will be described in greater detail below, the instant disclosure generally relates to apparatuses, systems, and methods for lockless resource versioning in single writer multiple reader technologies. In one example, a method for accomplishing such a task may include (1) publishing, by a writer, a first context that represents a lockless data structure at a first moment in time for access by a set of readers, (2) upon the publication of the first context, directing at least one of the readers to access an object stored in shared memory via the first context, (3) publishing, by the writer, a second context that represents the lockless data structure at a second moment in time for access by the set of readers, and (4) upon the publication of the second context, directing the at least one of the readers to access an additional object stored in the shared memory via the second context.

Similarly, a system that implements the above-identified method may include a single writer and a set of readers. In one example, this system may include at least one physical processing device configured to execute the writer and the set of readers such that (1) the writer publishes a first context that represents a lockless data structure at a first moment in time for access by a set of readers, (2) at least one of the readers accesses an object stored in shared memory via the first context upon the publication of the first context, (3) the writer publishes a second context that represents the lockless data structure at a second moment in time for access by the set of readers, and (4) the at least one of the readers accesses an additional object stored in the shared memory via the second context upon the publication of the second context.

Additionally or alternatively, an apparatus that implements the above-identified method may include at least one storage device that maintains a set of contexts that represent a lockless data structure at different moments in time. This apparatus may also include at least one physical processing device communicatively coupled to the storage device. This physical processing device may (1) publishes, by a writer, a first context that represents a lockless data structure at a first moment in time to the set of contexts for access by a set of readers, (2) accesses, by at least one of the readers, an object stored in shared memory via the first context within the set of contexts, (3) publishes, by the writer, a second context that represents the lockless data structure at a second moment in time to the set of contexts for access by the set of readers, and (4) accesses, by the at least one of the readers, an additional object stored in the shared memory via the second context within the set of contexts.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for lockless resource versioning in single writer multiple reader technologies. As will be explained in greater detail below, the various apparatuses, systems, and methods described herein may provide benefits and/or advantages over some traditional single writer multiple reader technologies. For example, the various apparatuses, systems, and methods described herein may enable multiple readers running on a computing device to access an object stored in shared memory simultaneously, as opposed to locking out all other readers while accessing that object. In doing so, these apparatuses, systems, and methods may be able to save the time and/or conserve the processing power involved in implementing locking mechanisms, thereby potentially improving the performance of certain single writer multiple reader technologies.

In another example, the various apparatuses, systems, and methods described herein may enable multiple readers running on a computing device to access an object stored in shared memory without tracking the number of readers currently accessing that object. In doing so, these apparatuses, systems, and methods may be able to save the time and/or conserve the processing power involved in tracking the number of readers currently accessing objects in shared memory, thereby potentially improving the performance of certain single writer multiple reader technologies.

The following will provide, with reference to FIGS. 1, 2, 4, and 5, detailed descriptions of exemplary apparatuses, systems, and corresponding implementations for lockless resource versioning in single writer multiple reader technologies. Detailed descriptions of an exemplary method for lockless resource versioning in single writer multiple reader technologies will be provided in connection with FIG. 3. In addition, detailed descriptions of an exemplary computing system for carrying out these methods will be provided in connection with FIG. 6.

Figure 1:
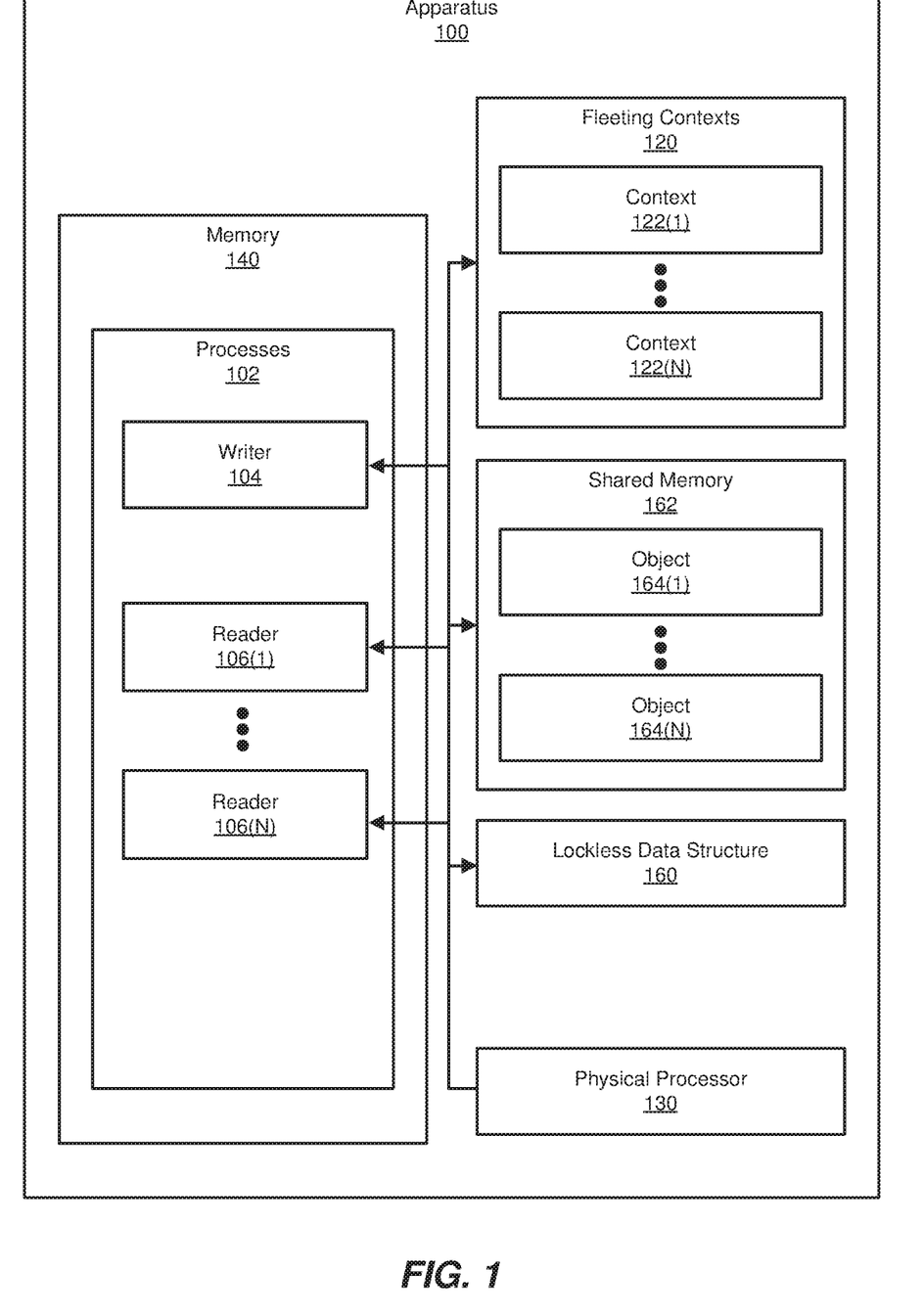
FIG. 1 is a block diagram of an exemplary apparatus for lockless resource versioning in single writer multiple reader technologies.

FIG. 1 shows an exemplary apparatus 100 that facilitates lockless resource versioning in single writer multiple reader technologies. As illustrated in FIG. 1, apparatus 100 may include one or more processes 102 for performing one or more tasks. As will be explained in greater detail below, processes 102 may include a writer 104 and a set of readers 106(1)-(N). In some examples, writer 104 and readers 106(1)-(N) may operate and/or function independently of one another. Although illustrated as separate elements, one or more of processes 102 in FIG. 1 may represent portions of a single module, application, and/or operating system.

In certain embodiments, one or more of processes 102 in FIG. 1 may represent one or more software applications or programs that, when executed by a computing device, cause the computing device to perform one or more tasks. For example, and as will be described in greater detail below, one or more of processes 102 may represent processes and/or modules stored and configured to run on one or more computing devices, such as the devices illustrated in FIG. 2 (e.g., computing devices 202, 224, and 226) and/or the devices illustrated in FIG. 6 (e.g., computing system 600). One or more of processes 102 in FIG. 1 may also represent all or portions of one or more special-purpose computers configured to perform one or more tasks.

As illustrated in FIG. 1, exemplary apparatus 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of processes 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary apparatus 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of processes 102 stored in memory 140. Additionally or alternatively, physical processor 130 may execute one or more of processes 102 to facilitate lockless resource versioning in single writer multiple reader technologies. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary apparatus 100 may further include and/or maintain a set of contexts 120. In one example, the set of contexts 120 may include and/or represent at least a context 122(1) and/or a context 122(N). In this example, the set of contexts 120 may represent a lockless data structure at different moments in time. Accordingly, each context within the set of contexts 120 may constitute and/or represent a snapshot of the lockless data structure at a given time. In some embodiments, multiple readers running on a computing device may be able to access objects stored in shared memory via the set of contexts 120.

In some examples, the set of contexts 120 may include and/or represent a chronological sequence of contexts available to the set of contexts 120 for accessing those objects stored in shared memory. In one example, a writer running on the computing device may create and/or publish a new context that includes, represents, and/or accounts for one or more changes made to the lockless data structure and/or the objects referenced by the lockless data structure in shared memory. In this example, the writer may create and/or publish new contexts on an as-needed basis and/or whenever necessary to account for changes made to the lockless data structure and/or the objects referenced by the lockless data structure in shared memory.

Although not necessarily illustrated in this way in FIG. 1, exemplary apparatus 100 may additionally include and/or maintain a set of discard lists 152 in connection with the set of contexts 120. In one example, if any of the objects referenced by the lockless data structure are modified, the writer may create and/or publish a new context that represents a snapshot of the lockless data structure at that moment in time. In this example, the new context may include and/or incorporate a discard list that contains references to all the objects no longer needed by readers 106(1)-(N). The references to those objects may indicate and/or suggest that those objects are no longer needed by the readers and/or indicate that the readers have effectively released those object for reclamation. Accordingly, the presence of those references in the discard list may prompt and/or trigger the deletion of those objects from shared memory. Additionally or alternatively, the presence of those references in the discard list may prompt and/or trigger the freeing and/or deallocation of the memory locations occupied by those objects in shared memory.

As illustrated in FIG. 1, exemplary apparatus 100 may also include and/or maintain a lockless data structure 160. In one example, lockless data structure 160 may include and/or represent a lock-free database and/or datastore that references and/or identifies the locations of the objects stored in shared memory. In this example, lockless data structure 160 may include and/or represent a collection of handles and/or references that point to or specify the objects stored in shared memory. Lockless data structure 160 may be used, accessed, and/or referenced by readers running on the computing device to identify and/or access the objects stored in shared memory.

As illustrated in FIG. 1, exemplary apparatus 100 may also include and/or maintain shared memory 162. In one example, shared memory 162 may include and/or represent all or a portion of a physical storage device (such as any type or form of volatile or non-volatile storage device or medium described above in connection with memory 140). In this example, shared memory 162 may store and/or maintain a set of objects 164(1)-(N) referenced by lockless data structure 160 and/or accessible to the readers and/or the writer running on the computing device. In one embodiment, shared memory 162 may constitute and/or represent a portion of memory 140. In another embodiment, shared memory 162 may constitute and/or represent all or a portion of a storage device distinct and/or separate from memory 140.

In some examples, objects 164(1)-(N) may each include and/or represent any type or form of data, file, portion of a file, and/or directory. In one example, each object may include and/or represent a route that identifies, indicates, and/or defines a particular forwarding path within, through, and/or across a network. In this example, lockless data structure 160 may include and/or represent a Forwarding Information Base (FIB) and/or Routing Information Base (RIB) that contains or is loaded with various routes. Additional examples of objects 164(1)-(N) include, without limitation, data representations of and/or references to physical devices or interfaces (such an "ifd" objects), logical devices or interfaces (such as an "ifl" objects), next hops, routes (such as IPv4 or IPv6 routes), functions, variables, data structures, primitive types, records, routing tables, forwarding tables, buffers, host cache entries, memory addresses, network addresses, text segments, code segments, variations or combinations of one or more of the same, and/or any other suitable data objects.

In some examples, object 164(1) may constitute and/or represent multiple versions (e.g., all versions) of a certain file or data across all of contexts 120. In other examples, one of objects 164(1)-(N) may constitute and/or represent a specific version of a file or data in one or more of contexts 120. In such examples, another one of objects 164(1)-(N) may constitute and/or represent a different version of that file or data in one or more of contexts 120.

Figure 2:
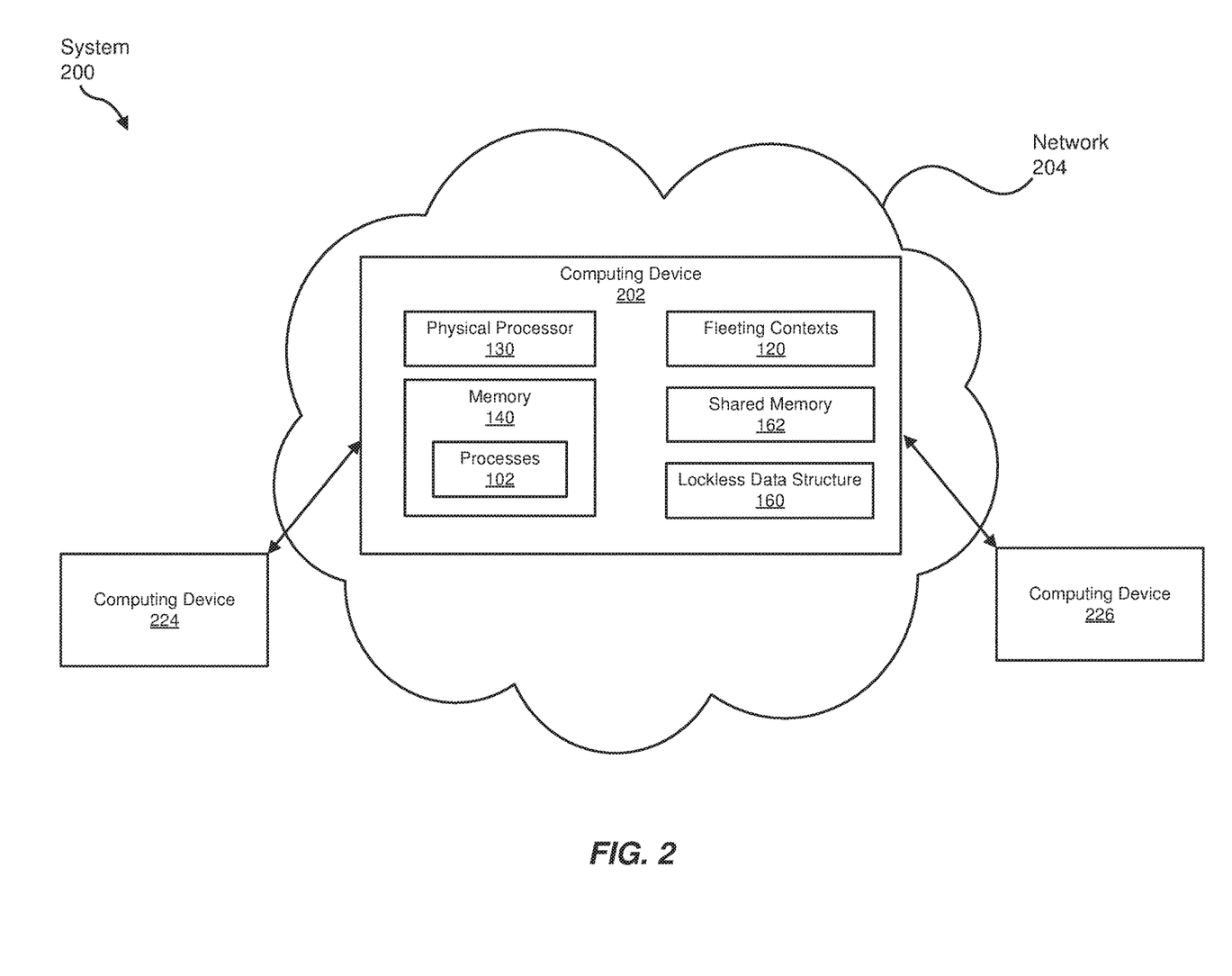
FIG. 2 is a block diagram of an exemplary system for lockless resource versioning in single writer multiple reader technologies.

In some examples, apparatus 100 in FIG. 1 may be implemented in a variety of ways. For example, all or a portion of exemplary apparatus 100 may represent portions of exemplary system 200 in FIG. 2. As shown in FIG. 2, system 200 may include a network 204 that facilitates communication among various computing devices (such as computing devices 202, 224, and 226). Although FIG. 2 illustrates computing devices 224 and 226 as being external to network 204, computing devices 224 and 226 may alternatively represent part of and/or be included within network 204.

In some examples, network 204 may include and/or represent various network devices that form and/or establish communication paths and/or segments. For example, network 204 may include and/or represent one or more segment routing paths. Although not illustrated in this way in FIG. 2, network 204 may include and/or represent one or more additional network devices and/or computing devices.

In some examples, and as will be described in greater detail below, one or more of processes 102 may cause computing device 202 to (1) publish, by a writer, a first context that represents a lockless data structure at a first moment in time for access by a set of readers, (2) upon the publication of the first context, direct at least one of the readers to access an object stored in shared memory via the first context, (3) publish, by the writer, a second context that represents the lockless data structure at a second moment in time for access by the set of readers, and (4) upon the publication of the second context, direct the at least one of the readers to access an additional object stored in the shared memory via the second context.

Computing devices 202, 224, and 226 each generally represent any type or form of physical computing device capable of reading computer-executable instructions and/or handling network traffic. Examples of computing devices 202, 224, and 226 include, without limitation, routers (such as provider edge routers, hub routers, spoke routers, autonomous system boundary routers, and/or area border routers), switches, hubs, modems, bridges, repeaters, gateways (such as Broadband Network Gateways (BNGs)), multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable computing devices.

Network 204 generally represents any medium or architecture capable of facilitating communication or data transfer. In some examples, network 204 may include other devices not illustrated in FIG. 2 that facilitate communication and/or form part of routing paths among computing devices 202, 224, and 226. Network 204 may facilitate communication or data transfer using wireless and/or wired connections. Examples of network 204 include, without limitation, an intranet, an access network, a layer 2 network, a layer 3 network, a Multiprotocol Label Switching (MPLS) network, an Internet Protocol (IP) network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
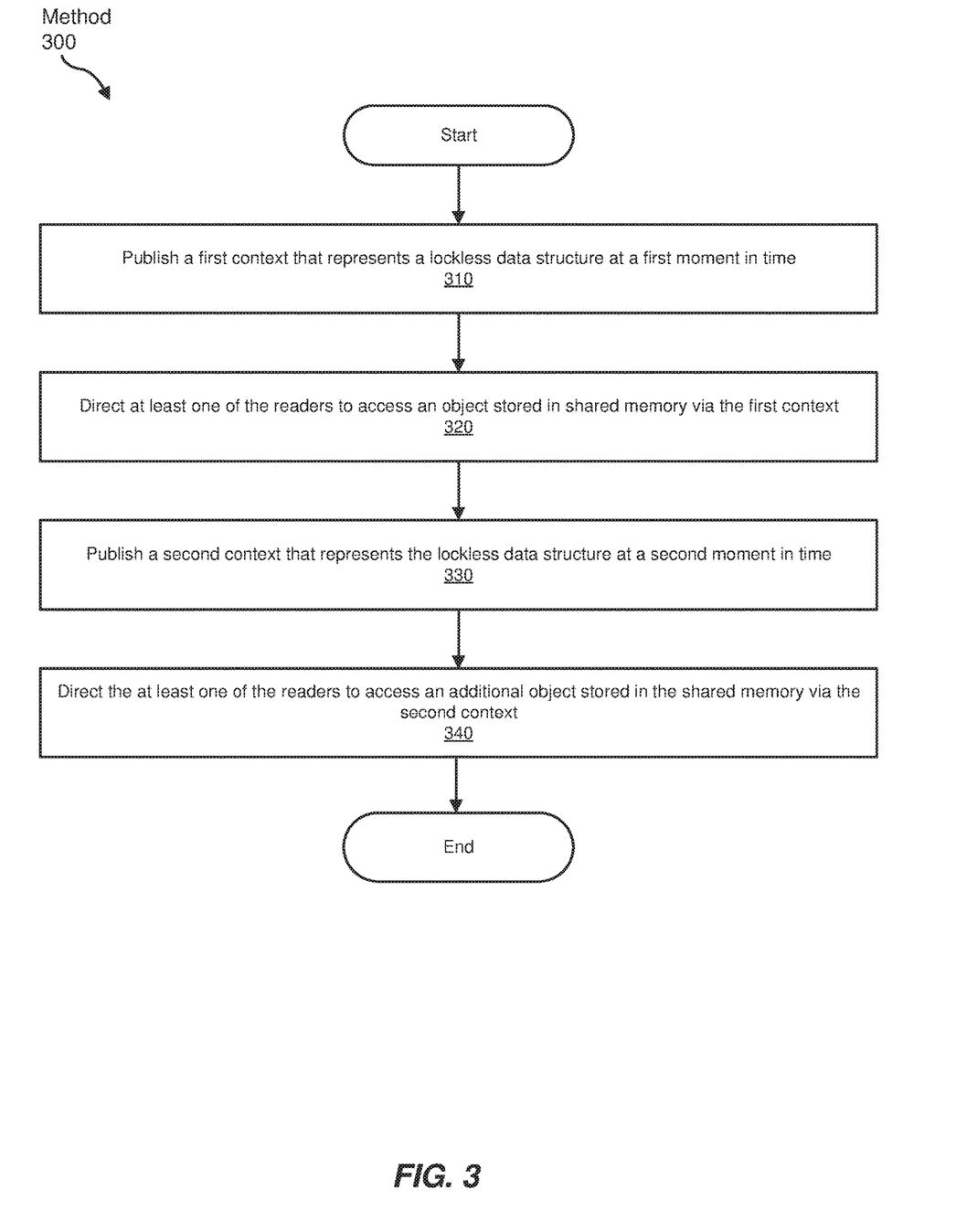
FIG. 3 is a flow diagram of an exemplary method for lockless resource versioning in single writer multiple reader technologies.

FIG. 3 is a flow diagram of an exemplary computer-implemented method 300 for lockless resource versioning in single writer multiple reader technologies. The steps shown in FIG. 3 may be performed by any suitable computer-executable code and/or computing system, including apparatus 100 in FIG. 1, system 200 in FIG. 2, implementation 400 in FIG. 4, system 600 in FIG. 6, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may publish a first context that represents a lockless data structure at a first moment in time for access by a set of readers. For example, writer 104 may, as part of computing device 202 in FIG. 2, publish context 122(1) that represents lockless data structure 160 at a first moment in time. In one example, context 122(1) may correspond to and/or represent the state of lockless data structure 160 at 12:30:00 PM on Dec. 25, 2019.

The systems described herein may perform step 310 in a variety of ways and/or contexts. In some examples, writer 104 may create, prepare, and/or stage context 122(1) for publication to readers 106(1)-(N) running on computing device 202. At this point, context 122(1) may yet to be published to readers 106(1)-(N). Accordingly, readers 106(1)-(N) may be unable to access and/or read any of objects 164(1)-(N) included in context 122(1) until context 122(1) is actually published.

In some examples, writer 104 may create, prepare, and/or publish a new context multiple times per second. In other examples, writer 104 may refrain from creating, preparing, and/or publishing a new context for multiple seconds at a time. The creation and/or publication frequency of these contexts may depend on and/or be driven by changes (e.g., additions, deletions, and/or modifications) made to objects 164(1)-(N) stored in shared memory 162.

In some examples, writer 104 may create, prepare, and/or stage a discard list for publication in connection with context 122(1). In other words, the discard list may be incorporated into context 122(1) and/or be published simultaneously with context 122(1). In one example, any handles and/or references included in the discard list may correspond to and/or represent those objects to be released, removed, and/or deleted from shared memory 124 once context 122(1) becomes obsolete to readers 106(1)-(N) running on computing device 202.

In some examples, by publishing context 122(1), writer 104 may add context 122(1) to the set of contexts 120. In one example, writer 104 may organize and/or manage the set of contexts 120. Additionally or alternatively, writer 104 may provide the set of contexts 120 to readers 106(1)-(N) running on computing device 202 in connection with a single writer multiple reader technology and/or implementation. In other words, writer 104 may enable readers running on computing device 202 to access or read one or more of objects 164(1)-(N) and/or other resources stored in shared memory 162 via the set of contexts 120.

In some examples, writer 104 may create and/or publish new contexts on an as-needed basis and/or whenever necessary to account for changes made to lockless data structure 160 and/or objects 164(1)-(N) referenced by lockless data structure 160 in shared memory 162. For example, when a new object is referenced by and/or included in lockless data structure 160 and/or added to shared memory 162, writer 104 may create and/or publish a new context that incorporates and/or accounts for the new object. In another example, when an object referenced by and/or included in lockless data structure 160 and/or stored in shared memory 162 is modified, writer 104 may create and/or publish a new context that incorporates and/or accounts for the modified object. In a further example, when an object referenced by and/or included in lockless data structure 160 and/or stored in shared memory 162 is removed or no longer needed, writer 104 may create and/or publish a new context that excludes and/or accounts for the removed object (in, e.g., a discard list).

In some examples, writer 104 may map objects stored in shared memory 162 to specific handles that reference those objects within and/or in connection with context 122(1). In one example, writer 104 may record, include, and/or provide these handles in context 122(1).

In some examples, the set of contexts 120 may be temporary and/or short-lived in nature. Accordingly, the oldest of contexts 120 may be removed and/or discarded when no longer needed and/or accessed by any of readers 106(1)-(N) running on computing device 202. For example, every time one of readers 106(1)-(N) accesses an object via one of contexts 120, that reader may do so via the newest and/or most recently published of contexts 120. In this example, as new contexts are published and/or added to the set of contexts 120, the older contexts within the set of contexts may become less and less accessed and/or used by readers 106(1)-(N). This trend may continue until the oldest reader within the set of contexts becomes totally obsolete to those readers. Once the oldest context within the set of contexts becomes totally obsolete, writer 104 may remove, discard, and/or delete that context. As a result, that obsolete context may no longer be included in and/or counted among the set of contexts 120.

Returning to FIG. 3, at step 320 one or more of the systems described herein may direct at least one of the readers to access an object stored in shared memory via the first context. For example, reader 106(1) may, as part of computing device 202 in FIG. 2, access one or more of objects 164(1)-(N) stored in shared memory 162 via context 122(1). In this example, reader 106(1) may initiate accessing such objects upon the publication of context 122(1). At the moment in time that reader 106(1) initiates such access, context 122(1) may be the most recently published one among the set of contexts 120. In other words, context 122(1) may be younger than all the others included in the set of contexts 120.

The systems described herein may perform step 320 in a variety of ways and/or contexts. In some examples, readers 106(1)-(N) may monitor and/or track the ages and/or publication times of the set of contexts 120. Additionally or alternatively, readers 106(1)-(N) may determine and/or identify the youngest and/or most recently published context within the set of contexts 120. For example, once writer 104 publishes context 122(1), one or more of readers 106(1)-(N) may determine that context 122(1) is the youngest and/or most recently published among the set of contexts 120. In one example, readers 106(1)-(N) may be programmed and/or configured to perform each new read operation via the most recently published context.

In some examples, one or more of readers 106(1)-(N) may enter context 122(1) to access and/or read one or more of objects 164(1)-(N). For example, reader 106(1) may access and/or read object 164(1) stored in shared memory 162 via a handle and/or reference included in context 122(1). Additionally or alternatively, reader 106(N) may access and/or read object 164(1) stored in shared memory 162 via a handle and/or reference included in context 122(1).

In another example, reader 106(1) may access and/or read object 164(N) stored in shared memory 162 via a handle and/or reference included in context 122(1). Additionally or alternatively, reader 106(N) may access and/or read object 164(N) stored in shared memory 162 via a handle and/or reference included in context 122(1).

In some examples, one or more of readers 106(1)-(N) may obtain, retrieve, and/or identify a handle that references one of objects 164(1)-(N) stored in shared memory 162 in connection with context 122(1). For example, reader 106(1) may search for and/or find the handle within context 122(1). In this example, reader 106(1) may then access and/or read the corresponding object with and/or using the handle via context 122(1).

In some examples, because context 122(1) represents a snapshot of a lockless data structure, multiple readers may be able to access and/or read the same object simultaneously via context 122(1) without applying a lock to that object. For example, readers 106(1) and 106(N) may access and/or read object 164(1) at the same moment in time via context 122(1). In this example, neither readers 106(1) nor 106(N) may apply a lock to object 164(1) while accessing and/or reading it.

As illustrated in FIG. 3, at step 330 one or more of the systems described herein may publish a second context that represents the lockless data structure at a second moment in time for access by the set of readers. For example, writer 104 may, as part of computing device 202 in FIG. 2, publish context 122(N) that represents lockless data structure 160 at a second moment in time. In one example, context 122(N) may correspond to and/or represent the state of lockless data structure 160 at 12:30:01 PM on Dec. 25, 2019.

The systems described herein may perform step 330 in a variety of ways and/or contexts. In some examples, writer 104 may create, prepare, and/or stage context 122(N) for publication to readers 106(1)-(N) running on computing device 202. At this point, context 122(N) may yet to be published to readers 106(1)-(N). Accordingly, readers 106(1)-(N) may be unable to access and/or read any of objects 164(1)-(N) included in context 122(N) until context 122(N) is actually published.

In some examples, writer 104 may create, prepare, and/or stage a discard list for publication in connection with context 122(N). In other words, the discard list may be incorporated into context 122(N) and/or be published simultaneously with context 122(N). In one example, any handles and/or references included in the discard list may correspond to and/or represent those objects to be released, removed, and/or deleted from shared memory 124 once context 122(N) becomes obsolete to readers 106(1)-(N) running on computing device 202.

In some examples, by publishing context 122(N), writer 104 may add context 122(N) to the set of contexts 120. In one example, context 122(N) may replace and/or supplant context 122(1) as the youngest and/or most recently published among the set of contexts 120. As a result, after the second moment in time, readers 106(1)-(N) may no longer perform any new read operations on context 122(1). In other words, after the second moment in time, readers 106(1)-(N) may refrain from entering context 122(1) in connection with any new read operations. Readers 106(1)-(N) may continue to perform or complete any existing and/or ongoing read operations in context 122(1). However, after the second moment in time, readers 106(1)-(N) may initiate and/or execute any new read operations via context 122(N) instead of entering context 122(1) as part of a new transaction.

In some examples, writer 104 may prepare context 122(N) for publication in response to and/or to account for the addition of one or more new objects to shared memory 162. For example, writer 104 may write and/or add a new object to shared memory 162 between the first moment in time and the second moment in time. In other words, this new object may be written and/or added to shared memory 162 after the publication of context 122(1) but before the publication of context 122(N). In this example, writer 104 may map the new object to a specific handle that references this new object within and/or in connection with context 122(N). In one example, writer 104 may record, include, and/or provide this handle in context 122(N).

In some examples, writer 104 may prepare context 122(N) for publication in response to and/or to account for the deletion and/or removal of one or more objects from shared memory 162. In one example, writer 104 may delete and/or remove an existing object from shared memory 162 between the first moment in time and the second moment in time. In other words, this object may be deleted and/or removed from shared memory 162 after the publication of context 122(1) but before the publication of context 122(N). For example, writer 104 may include and/or add the handle that references this object to a discard list of context 122(N) to facilitate the reclamation of the memory location occupied by this object in shared memory 162 once context 122(N) expires. In this example, writer 104 may reclaim, release, and/or deallocate the memory locations of all the objects referenced and/or identified in the discard list of context 122(N) once readers 106(1)-(N) are finished accessing context 122(N).

As a specific example, at a later moment in time, writer 104 may determine that none of readers 106(1)-(N) need, access, and/or use context 122(N) any longer. In this example, readers 106(1)-(N) may instead need, access, and/or use one or more younger and/or more recently published contexts among the set of contexts 120. In response to this determination, writer 104 may identify a handle that references an object stored in shared memory 162 within the discard list of context 122(N). Writer 104 may then reclaim, release, and/or deallocate the memory location occupied by that object in shared memory 162. Additionally or alternatively, writer 104 may remove and/or delete that object from shared memory 162.

In some examples, writer 104 may prepare context 122(N) for publication in response to and/or to account for the modification and/or alteration of one or more objects from shared memory 162. In one example, writer 104 may retrieve, obtain, and/or copy an existing object from a first memory location in shared memory 162 between the first moment in time and the second moment in time. In this example, writer 104 may modify and/or alter that object (or a copy of that object) in one way or another. Writer 104 may then store the modified and/or altered object at a second memory location in shared memory 162. For example, writer 104 may write and/or add the modified object to the second memory location in shared memory 162 between the first moment in time and the second moment in time. Accordingly, this modified object may be written and/or added to the second memory location in shared memory 162 after the publication of context 122(1) but before the publication of context 122(N). In this example, writer 104 may map the modified object to the handle that referenced the original object within and/or in connection with context 122(1). In one example, writer 104 may record, include, and/or provide this handle in context 122(N), but instead of refencing the original object at the first memory location in shared memory 162, this handle now references the modified object at the second memory location in shared memory 162.

Returning to FIG. 3, at step 340 one or more of the systems described herein may direct the at least one of the readers to access an additional object stored in shared memory via the second context. For example, reader 106(1) may, as part of computing device 202 in FIG. 2, access one or more of objects 164(1)-(N) stored in shared memory 162 via context 122(N). In this example, reader 106(1) may initiate accessing such objects upon the publication of context 122(N). At the moment in time that reader 106(1) initiates such access, context 122(N) may be the most recently published one among the set of contexts 120. In other words, context 122(N) may now be younger than all the others (e.g., context 122(1)) included in the set of contexts 120.

In some embodiments, the object accessed by reader 106(1) via context 122(N) may include and/or represent the same object accessed by reader 106(1) via context 122(1). In other embodiments, the object accessed by reader 106(1) via context 122(N) may include and/or represent a modified copy of the object accessed by reader 106(1) via context 122(1). In further embodiments, the object accessed by reader 106(1) via context 122(N) may include and/or represent a separate object that is distinct from the one accessed by reader 106(1) via context 122(1).

The systems described herein may perform step 340 in a variety of ways and/or contexts. In some examples, once writer 104 publishes context 122(N), one or more of readers 106(1)-(N) may determine that context 122(N) is now the youngest and/or most recently published among the set of contexts 120. Additionally or alternatively, one or more of readers 106(1)-(N) may determine that context 122(1) is no longer the youngest and/or most recently published among the set of contexts 120. As described above, readers 106(1)-(N) may be programmed and/or configured to perform each new read operation via the most recently published context.

In some examples, one or more of readers 106(1)-(N) may enter context 122(N) to access and/or read one or more of objects 164(1)-(N). For example, reader 106(1) may access and/or read object 164(1) stored in shared memory 162 via a handle and/or reference included in context 122(N). Additionally or alternatively, reader 106(N) may access and/or read object 164(1) stored in shared memory 162 via a handle and/or reference included in context 122(N).

In another example, reader 106(1) may access and/or read object 164(N) stored in shared memory 162 via a handle and/or reference included in context 122(N). Additionally or alternatively, reader 106(N) may access and/or read object 164(N) stored in shared memory 162 via a handle and/or reference included in context 122(N).

In some examples, one or more of readers 106(1)-(N) may obtain, retrieve, and/or identify a handle that references one of objects 164(1)-(N) stored in shared memory 162 in connection with context 122(N). For example, reader 106(1) may search for and/or find the handle within context 122(N). In this example, reader 106(1) may then access and/or read the corresponding object with and/or using the handle via context 122(N).

In some examples, because context 122(N) represents a snapshot of a lockless data structure, multiple readers may be able to access and/or read the same object simultaneously via context 122(N) without applying a lock to that object. For example, readers 106(1) and 106(N) may access and/or read object 164(N) at the same moment in time via context 122(N). In this example, neither readers 106(1) nor 106(N) may apply a lock to object 164(N) while accessing and/or reading it.

In some examples, writer 104 may publish various additional contexts that represent lockless data structure 160 at various subsequent moments in time for access by readers 106(1)-(N). In such examples, upon the publication of each additional context, readers 106(1)-(N) may access and/or read one or more objects stored in shared memory 162 via that additional context.

Figure 4:
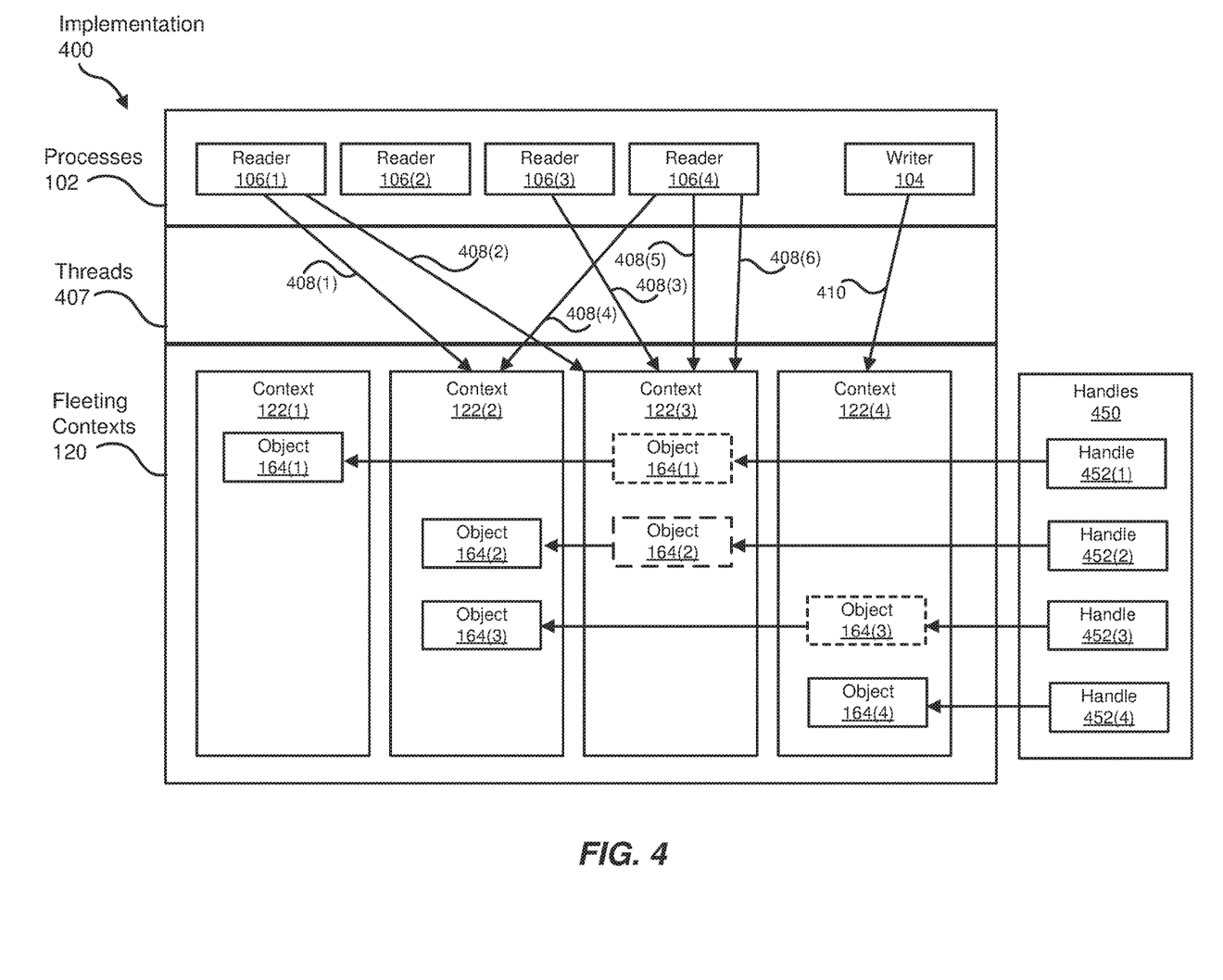
FIG. 4 is a block diagram of an exemplary implementation for lockless resource versioning in single writer multiple reader technologies.

FIG. 4 is a block diagram of an exemplary implementation 400 that demonstrates lockless resource versioning in single writer multiple reader technologies. As illustrated in FIG. 4, exemplary implementation 400 may include and/or involve processes 102, threads 407, and/or contexts 120. In some examples, the objects accessible via contexts 120 may be mapped to handles 450 that correspond to and/or reference those objects in connection with contexts 120.

In some examples, processes 102 may include and/or represent readers 106(1), 106(2), 106(3), and 106(4) as well as writer 104. In such examples, readers 106(1)-(4) may be able to read objects stored in shared memory by accessing contexts 120 via threads 407. Readers 106(1)-(4), however, may be unable to write, overwrite, modify, and/or delete those objects in shared memory. Instead, only writer 104 may be able to write, overwrite, modify, and/or delete those objects in shared memory.

In some examples, writer 104 may publish and/or maintain contexts 120. contexts 120 may each include and/or reference one or more objects in shared memory. For example, contexts 122(1), 122(2), 122(3), and 122(4) may each include and/or reference one or more of objects 164 (1)-(N) stored in shared memory 162. In one example, contexts 122(1)-(3) may constitute and/or represent those contexts that have already been published to readers 106 (1)-(4) for accessing certain objects stored in shared memory. However, in this example, context 122(4) may have yet to be published to readers 106(1)-(4). Instead, writer 104 may be in the process of creating and/or preparing context 122(4) for publication to readers 106(1)-(4). As part of this process, writer 104 may perform a write operation 410 that populates context 122(4) with handles and/or references to any shared objects stored in shared memory at that moment in time.

In some examples, each of threads 407 may constitute and/or represent a read operation or transaction performed by one of readers 106(1)-(4). Upon the completion and/or termination of one of threads 407, the corresponding reader may redeploy and/or relaunch that thread on the most recently published context within the set of contexts 120. In one example, the set of contexts 120 may be represented and/or displayed in FIG. 4 in a chronological order from oldest on the left to youngest on the right. Accordingly, context 122(1) may be the oldest among the set of contexts 120 in FIG. 4, and context 122(4) may be the youngest among the set of contexts 120 in FIG. 4. However, as described above, context 122(4) may not yet have been published to readers 106(1)-(4) at the moment in time represented in FIG. 4. Thus, context 122(3) may be the youngest published context at the moment in time represented in FIG. 4.

As illustrated in FIG. 4, none of readers 106(1)-(4) may be currently accessing context 122(1) via any of threads 407. Accordingly, context 122(1) may be effectively obsolete to readers 106(1)-(4), as readers 106(1)-(4) are programmed and/or configured to perform new read operations and/or transactions via the most recently published context with the set of contexts 120. In other words, because context 122(1) is the oldest among the set of contexts 120, readers 106(1)-(4) may refrain from performing any subsequent read operations and/or transactions via context 122(1). Instead, readers 106(1)-(4) may perform new read operations and/or transactions via context 122(3) at the moment in time represented in FIG. 4, as context 122(3) happens to be the youngest published context at that time. However, once context 122(4) is eventually published, readers 106(1)-(4) may perform new read operations and/or transactions via context 122(4) until a subsequent context is published by writer 104.

In some examples, writer 104 may map handles 450 to all or a portion of the objects stored in shared memory within contexts 120. For example, writer 104 may map handle 452(1) to object 164(1) across all of contexts 122(1)-(4). In this example, writer 104 may also map handle 452(2) to object 164(2) across contexts 122(2) and 122(3). Additionally or alternatively, writer 104 may map handle 452(3) to object 164(3) across all of contexts 122(2)-(4). Writer may further map handle 452(4) to object 164(4) in context 122(4).

Although not necessarily illustrated in this way in FIG. 4, contexts 122(1)-(4) in FIG. 4 may include and/or represent additional objects and/or mappings between handles and objects. Instead, contexts 122(1)-(4) in FIG. 4 may illustrate and/or show only changes made to objects stored in shared memory from one context to the next. For example, prior to the publication of context 122(1), writer 104 may write and/or add object 164(1) to shared memory and/or insert handle 452(1) in context 122(1) to facilitate access by readers 106(1)-(4) to object 164(1) after the publication of context 122(1). In another example, between the publications of contexts 122(1) and 122(2), writer 104 may write and/or add objects 164(2) and 164(3) to shared memory and/or insert handles 452(2) and 452(3) in context 122(2) to facilitate access by readers 106(1)-(4) to objects 164(2) and 164(3) after the publication of context 122(2).

In an additional example, between the publications of contexts 122(2) and 122(3), writer 104 may modify a copy of object 164(1) and then store the modified copy of object 164(1) in a different memory location in shared memory. In this example, writer 104 may remap handle 452(1) to reference the different memory location in shared memory for context 122(3). Additionally or alternatively, between the publications of contexts 122(2) and 122(3), writer 104 may insert, include, and/or specify handle 452(2) within a discard list of context 122(3) such that, once context 122(3) expires and/or becomes obsolete, object 164(2) is removed and/or deleted from shared memory and/or the memory location occupied by object 164(2) is reclaimed, released, and/or deallocated in shared memory.

In a further example, between the publications of contexts 122(3) and 122(4), writer 104 may modify a copy of object 164(3) and then store the modified copy of object 164(3) in a different memory location in shared memory. In this example, writer 104 may remap handle 452(3) to reference the different memory location in shared memory for context 122(4). Additionally or alternatively, between the publications of contexts 122(3) and 122(4), writer 104 may write and/or add object 164(4) to shared memory and/or insert handle 452(4) in context 122(1) to facilitate access by readers 106(1)-(4) to object 164(4) after the publication of context 122(4).

In some examples, objects included in a certain context may point to and/or reference other objects included in that context. For example, object 164(3) included in context 122(2) may constitute and/or represent a pointer and/or handle that references object 164(2) included in context 122(2). In another example, object 164(4) included in context 122(2) may constitute and/or represent a pointer and/or handle that references another object included in context 122(4).

In some examples, reader 106(1) may enter context 122(2) via a thread 408(1) and/or context 122(3) via a thread 408(2). In one example, reader 106(1) may access and/or read any of the objects included in context 122(2) via thread 408(1). In this example, reader 106(1) may access and/or read any of the objects included in context 122(3) via thread 408(2).

In some examples, reader 106(2) may not currently be accessing any of contexts 120. In one example, writer 104 may check the status and/or functionality of reader 106(2) by attempting to apply and/or take a lock on a log associated with reader 106(2). By doing so, writer 104 may be able to determine whether reader 106(2) has failed and/or stalled. In one example, writer 104 may determine that the attempt to apply the lock on reader 106(2) was successful, thereby indicating that reader 106(2) has indeed failed and/or stalled. In this example, writer 104 may determine and/or confirm that reader 106(2) is no longer functional or operational. In response to this determination and/or confirmation, writer 104 may disregard and/or ignore the information contained in the log associated with reader 106(2). For example, if the log associated with reader 106(2) indicates that reader 106(2) is actively accessing context 122(1), writer 104 may disregard and/or ignore this misinformation and still determine and/or confirm that context 122(1) has expired and/or become obsolete within contexts 120 despite this misinformation.

In another example, writer 104 may determine that the attempt to apply the lock on reader 106(2) was unsuccessful, thereby indicating that reader 106(2) is still operational and/or functional despite its current lack of threads deployed on contexts 120. As a result, writer 104 may continue to rely upon the information contained in the log associated with reader 106(2) and/or make determinations as to whether any of contexts 120 have expired and/or become obsolete based at least in part on such information.

In some examples, reader 106(3) may enter context 122(3) via a thread 408(3). In one example, reader 106(3) may access and/or read any of the objects included in context 122(3) via thread 408(3). In this example, reader 106(3) may be able to access and/or read a modified version of object 164(1) stored at a different location in shared memory via context 122(3). Accordingly, reader 106(3) may be unable to access and/or read the original version of object 164(1) stored at the original location in shared memory via context 122(3).

Additionally or alternatively, handle 452(2) that references object 162(2) across contexts 120 may be included in and/or specified by the discard list of context 122(3). As a result, once context 122(3) expires and/or becomes obsolete, writer 104 may remove and/or delete object 164(2) from shared memory and/or reclaim, release, and/or deallocate the memory location occupied by object 164(2) in shared memory.

In some examples, reader 106(4) may enter context 122(2) via a thread 408(4) and/or context 122(3) via threads 408(5) and 408(6). In one example, reader 106(4) may access and/or read any of the objects included in context 122(2) via thread 408(1). In this example, reader 106(4) may access and/or read any of the objects included in context 122(3) via thread 408(5) or 408(6).

On the one hand, reader 106(4) may be able to access and/or read the modified version of object 164(1) stored at the different location in shared memory via thread 408(5) or 408(6) deployed on context 122(3). Accordingly, reader 106(4) may be unable to access and/or read the original version of object 164(1) stored at the original location in shared memory via thread 408(5) or 408(6) deployed on context 122(3). On the other hand, reader 106(4) may still be able to access and/or read the original version of object 164(1) stored at the original location in shared memory via thread 408(4) deployed on context 122(2). However, reader 106(4) may be unable to access and/or read the modified version of object 164(1) stored at the different location in shared memory via thread 408(4) deployed on context 122(2).

As a specific example, readers 106(1)-(4) may write to and/or update one or more logs (not necessarily illustrated in FIG. 4) to indicate that readers 106(1)-(4) are currently accessing only contexts 122(2) and 122(3) via threads 407 at that moment in time. In this example, writer 104 may read such logs to determine which of contexts 120 are currently being accessed by readers 106(1)-(4). In one example, writer 104 may determine that context 122(1) has expired and/or become obsolete because none of readers 106(1)-(4) are still accessing context 122(1).

In response to the determination that context 122(1) has expired and/or become obsolete, writer 104 may search the discard list of context 122(1) for any and all references to shared objects that are no longer needed by readers 106(1)-(4). In one example, writer 104 may reclaim, release, and/or disclaim the memory locations occupied by the objects corresponding to references identified in and/or specified by that discard list. In this example, writer 104 may delete, remove, modify, and/or overwrite the objects stored in those memory locations in shared memory. Additionally or alternatively, writer 104 may delete, remove, discard, and/or overwrite context 122(1) because it has expired and/or become obsolete.

Figure 5:
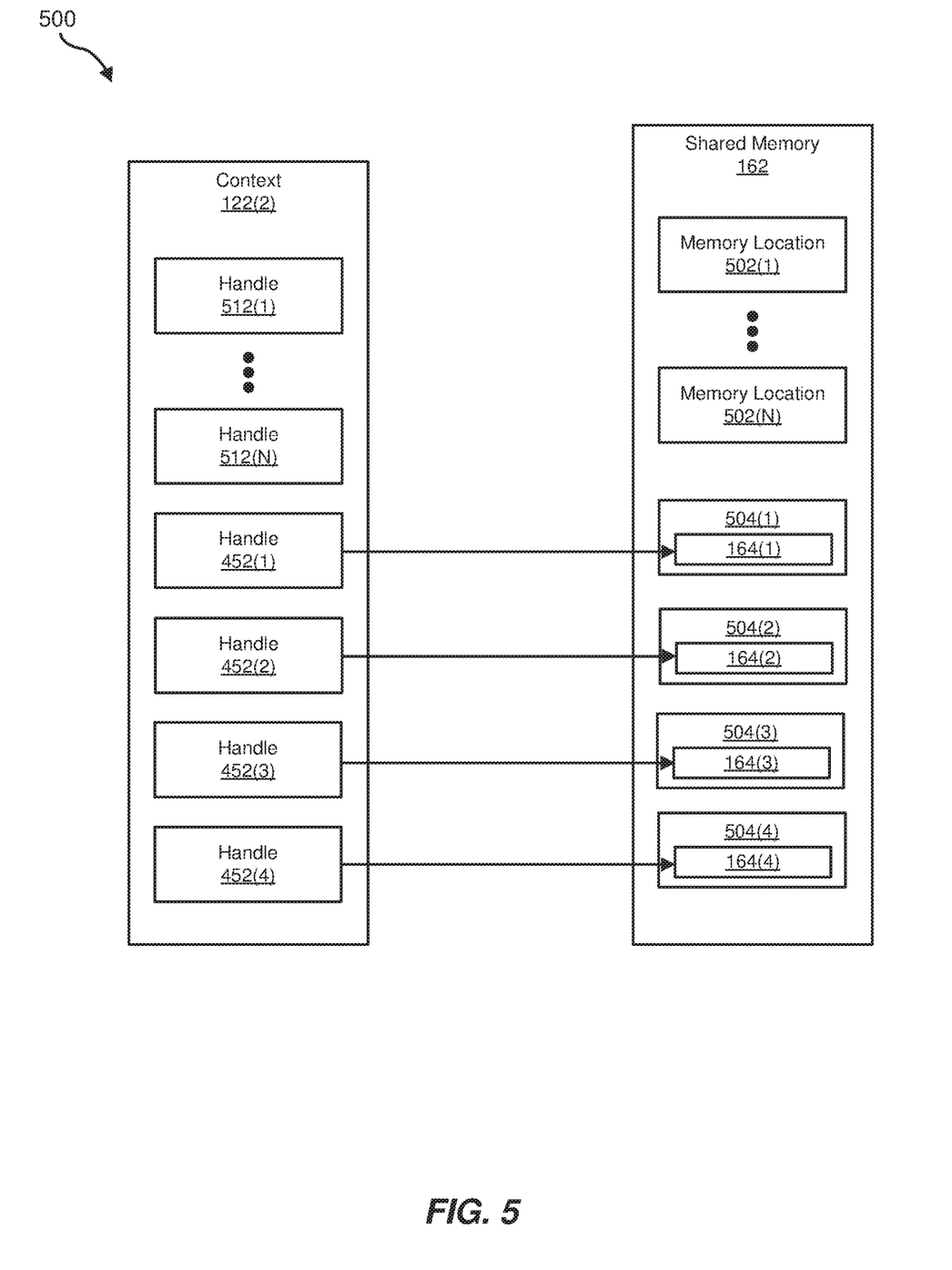
FIG. 5 is a block diagram of an exemplary implementation for lockless resource versioning in single writer multiple reader technologies.

FIG. 5 is a block diagram of an exemplary implementation 500 that demonstrates lockless resource versioning in single writer multiple reader technologies. As illustrated in FIG. 5, exemplary implementation 500 may include and/or involve context 122(2), which represents and/or captures the state and/or configuration of lockless data structure 160 at a certain moment in time. In this example, implementation 500 may also include and/or involve shared memory 162.

In one example, context 122(2) may include and/or represent a set of handles and/or references that lead, point, and/or correspond to objects stored and/or maintained in shared memory 162. In this example, shared memory 162 may include and/or represent memory locations 502(1)-(N) that store and/or maintain certain objects accessible to readers 106(1)-(4). In addition, context 122(2) may include and/or represent handles 512(1)-(N) as well as handles 452(1)-(4), which lead, point, and/or correspond to objects 164(1)-(4) stored and/or maintained in memory locations 504(1), 504(2), 504(3), 504(4) of shared memory 162.

Figure 6:
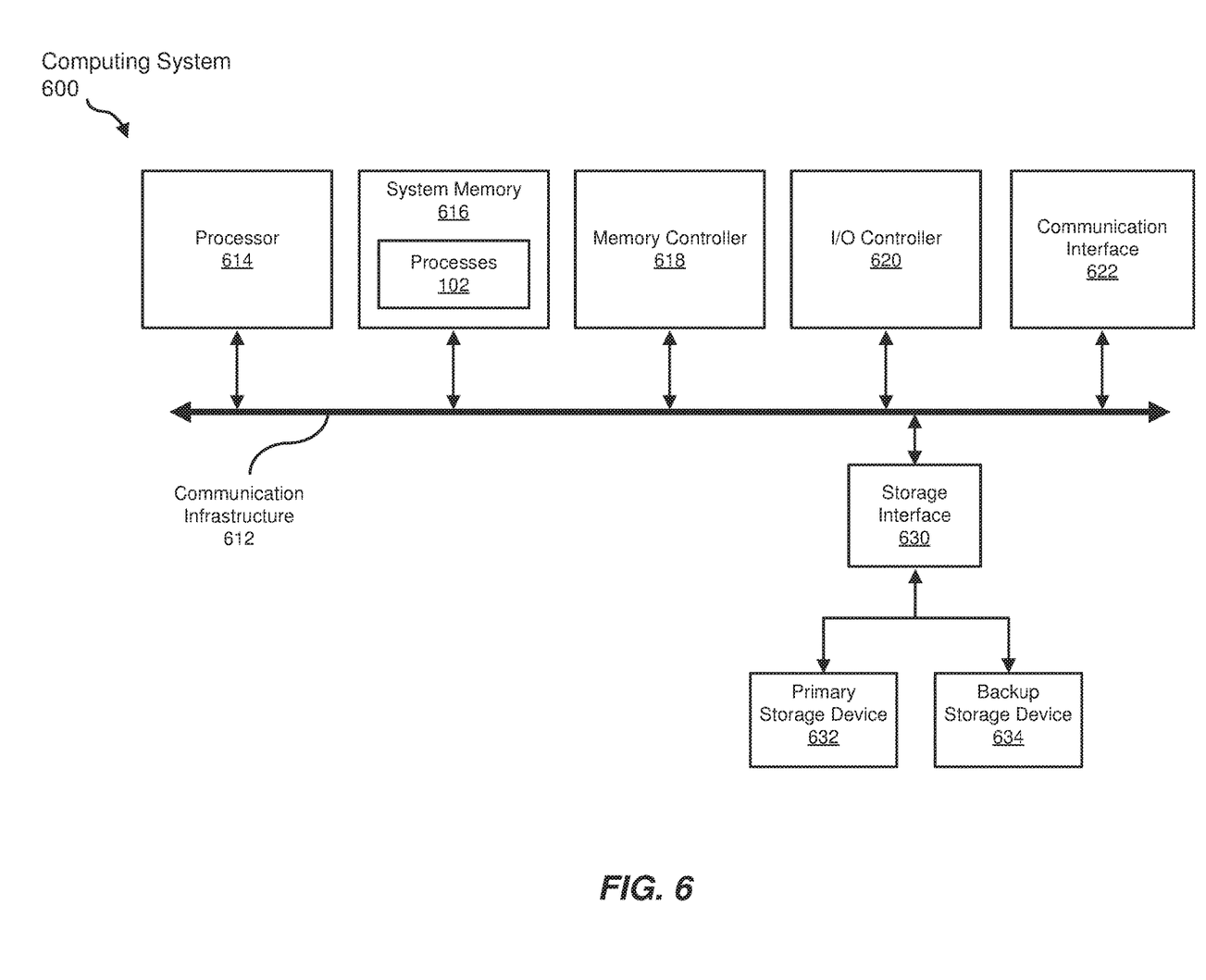
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O)

controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   publishing, by a writer executed on a physical processor of a computing device, a first context that represents a lockless data structure at a first moment in time for access by a set of readers executed on the physical processor of the computing device;
   upon the publication of the first context, directing at least one of the readers to access an object stored in shared memory via the first context;
   publishing, by the writer, a second context that represents the lockless data structure at a second moment in time for access by the set of readers; and
   upon the publication of the second context, directing the at least one of the readers to access an additional object stored in the shared memory via the second context.

2. The method of claim 1, wherein directing the at least one of the readers to access the object via the first context comprises:
   obtaining, by the at least one of the readers, a handle that references the object in connection with the first context; and
   accessing, by the at least one of the readers, the object with the handle via the first context.

3. The method of claim 1, further comprising, prior to the publication of the second context, preparing the second context for publication by:
   writing at least one new object to the shared memory between the first moment in time and the second moment in time; and
   mapping, within the second context, the new object to a handle that references the new object in connection with the second context.

4. The method of claim 1, further comprising, prior to the publication of the second context, preparing the second context for publication by identifying the object for removal from the shared memory between the first moment in time and the second moment in time.

5. The method of claim 4, wherein identifying the object for removal from the shared memory comprises adding a handle that references the object to a discard list of the second context to facilitate reclamation of a memory location occupied by the object in the shared memory once the first context expires.

6. The method of claim 5, further comprising:
   determining that the first context has expired; and
   in response to determining that the first context has expired:
      identifying, within the discard list of the second context, the handle that references the object; and
      reclaiming the memory location occupied by the object in the shared memory.

7. The method of claim 1, further comprising, prior to the publication of the second context, preparing the second context for publication by:
   retrieving the object from a first memory location in the shared memory;
   modifying the object; and
   storing the modified object at a second memory location in the shared memory.

8. The method of claim 7, further comprising:
   mapping, within the first context, the object as stored in the first memory location to a handle in connection with the first context; and
   mapping, within the second context, the modified object as stored in the second memory location to the handle in connection with the second context.

9. The method of claim 1, further comprising:
   publishing, by the writer, a third context that represents the lockless data structure at a third moment in time for access by the set of readers; and
   upon the publication of the third context, directing the at least one of the readers to access a further object stored in the shared memory via the third context.

10. The method of claim 1, wherein the additional object comprises at least one of:
    a modified copy of the object; and
    a separate object that is distinct from the object.

11. The method of claim 1, wherein directing the at least one of the readers to access the object comprises directing a plurality of the readers to access the object simultaneously via the first context without applying a lock on the object.

12. The method of claim 1, wherein directing the at least one of the readers to access the additional object comprises directing a plurality of the readers to access the additional object simultaneously via the second context without applying a lock on the additional object.

13. The method of claim 1, wherein the writer and the readers operate independently of one another.

14. The method of claim 1, wherein:
the lockless data structure comprises at least a portion of a Forwarding Information Base (FIB) implemented on a network device; and
the object comprises a route stored in the FIB implemented on the network device.

15. A system comprising:
a writer;
a set of readers; and
at least one physical processing device configured to execute the writer and the set of readers such that:
the writer publishes a first context that represents a lockless data structure at a first moment in time for access by the set of readers;
at least one of the readers accesses an object stored in shared memory via the first context upon the publication of the first context;
the writer publishes a second context that represents the lockless data structure at a second moment in time for access by the set of readers; and
the at least one of the readers accesses an additional object stored in the shared memory via the second context upon the publication of the second context.

16. The system of claim 15, wherein the at least one of the readers:
obtains a handle that references the object in connection with the first context; and
accessing the object with the handle via the first context.

17. The system of claim 15, wherein the writer, prior to the publication of the second context, prepares the second context for publication by:
writing at least one new object to the shared memory between the first moment in time and the second moment in time; and
mapping, within the second context, the new object to a handle that references the new object in connection with the second context.

18. The system of claim 15, wherein the writer, prior to the publication of the second context, prepares the second context for publication by identifying the object for removal from the shared memory between the first moment in time and the second moment in time.

19. The system of claim 18, wherein the writer adds a handle that references the object to a discard list of the second context to facilitate reclamation of a memory location occupied by the object in the shared memory once the first context expires.

20. An apparatus comprising:
at least one storage device that maintains a set of contexts that represent a lockless data structure at different moments in time; and
at least one physical processing device communicatively coupled to the storage device, wherein the physical processing device:
publishes, by a writer, a first context that represents the lockless data structure at a first moment in time to the set of contexts for access by a set of readers;
accesses, by at least one of the readers, an object stored in shared memory via the first context within the set of contexts;
publishes, by the writer, a second context that represents the lockless data structure at a second moment in time to the set of contexts for access by the set of readers; and
accesses, by the at least one of the readers, an additional object stored in the shared memory via the second context within the set of contexts.

* * * * *